(12) United States Patent
Muramatsu

(10) Patent No.: US 11,960,194 B2
(45) Date of Patent: Apr. 16, 2024

(54) CAMERA

(71) Applicant: NIDEC COPAL CORPORATION, Tokyo (JP)

(72) Inventor: Mami Muramatsu, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 18/063,682

(22) Filed: Dec. 9, 2022

(65) Prior Publication Data

US 2023/0185166 A1 Jun. 15, 2023

(30) Foreign Application Priority Data

Dec. 14, 2021 (JP) ................. 2021-202708

(51) Int. Cl.
*G03B 17/12* (2021.01)
*G03B 5/00* (2021.01)
*G03B 13/10* (2021.01)
*G03B 13/14* (2021.01)
*G03B 17/04* (2021.01)

(52) U.S. Cl.
CPC ............... *G03B 17/12* (2013.01); *G03B 5/00* (2013.01); *G03B 13/10* (2013.01); *G03B 13/14* (2013.01); *G03B 17/04* (2013.01)

(58) Field of Classification Search
CPC ................................ G03B 13/14; G03B 13/10
See application file for complete search history.

(56) References Cited

U.S. PATENT DOCUMENTS

| 5,258,792 A * | 11/1993 | Suzuki | G03B 13/14 |
| | | | 396/377 |
| 5,678,093 A * | 10/1997 | Asakura | G03B 17/425 |
| | | | 396/436 |
| 6,400,904 B1 * | 6/2002 | Kobayashi | G03B 13/02 |
| | | | 396/144 |

FOREIGN PATENT DOCUMENTS

| JP | 2002090818 A | * | 3/2002 |
| JP | 201928295 A | | 2/2019 |

* cited by examiner

*Primary Examiner* — Leon W Rhodes, Jr.
(74) *Attorney, Agent, or Firm* — HAUPTMAN HAM, LLP

(57) ABSTRACT

A camera includes a viewfinder portion causing a frontward field of view to be visible through a viewfinder, and a drive lever rotatable about a shaft. An operation cylinder operable to extend and contract an extendable unit includes a guide surface extending in a circumferential direction and a recess adjacent to the guide surface. The drive lever includes an actuation portion that comes in contact with the guide surface of the operation cylinder. The camera further includes an urging member urging the actuation portion in the drive lever, a prism that changes a direction of a field of view visible through the viewfinder portion, and a prism guide lever rotatable about a shaft. The prism guide lever includes a prism holder holding the prism, and a follower gear meshing with a drive gear in the drive lever. The prism holder is placeable into the viewfinder portion.

7 Claims, 12 Drawing Sheets

CAMERA

RELATED APPLICATIONS

The present application claims priority to Japanese Application Number 2021-202708, filed Dec. 14, 2021, the disclosure of which is hereby incorporated by reference herein in its entirety.

BACKGROUND

Technical Field

The present invention relates to a camera, and particularly, to a camera including a lens barrel that is extendable in an optical axis direction.

Description of the Background

A known camera includes a lens barrel that allows one or more cylinders to extend and retract in an optical axis direction when an operation ring is rotated (refer to, for example, Patent Literature 1). Such a camera is nowadays used to allow, in addition to a normal photographing operation, a short-distance photographing (macro photographing) operation by extending the lens barrel more frontward than in the normal photographing operation.

Such a camera typically includes a viewfinder through which a user observes an object. In the macro photographing operation, the object is closer to the camera than in the normal photographing operation and thus may not fit within the field of view visible through the viewfinder. This can cause difficulty in successfully performing the macro photographing operation. A technique is awaited for easily changing the field of view through a viewfinder depending on the extended state of a lens barrel.

CITATION LIST

Patent Literature

Patent Literature 1: Japanese Unexamined Patent Application Publication No. 2019-28295

BRIEF SUMMARY

In response to the above issue, one or more aspects of the present invention are directed to a camera that can change the field of view through a viewfinder depending on the extended state of a lens barrel.

A camera according to one aspect of the present invention can change the field of view through a viewfinder depending on the extended state of a lens barrel. The camera includes a housing having a front surface with a viewfinder, a frame accommodated in the housing, a lens barrel accommodating at least one lens, a viewfinder portion causing a frontward field of view to be visible through the viewfinder in the housing, and a drive lever rotatable about a first shaft. The lens barrel includes a stationary cylinder including a base fastened to the frame and a cylindrical wall extending in an axial direction from the base, an extendable unit located radially inward from the cylindrical wall of the stationary cylinder and extendable in the axial direction, and an operation cylinder rotatable relative to the stationary cylinder without moving in the axial direction to extend and contract the extendable unit. The operation cylinder includes a guide surface extending in a circumferential direction, and a lever drive adjacent to the guide surface in the circumferential direction. The lever drive has an outer diameter different from an outer diameter of the guide surface. The drive lever includes an actuation portion that comes in contact with the guide surface of the operation cylinder, and a drive gear including a plurality of teeth. The camera includes an urging member urging the actuation portion in the drive lever toward the guide surface of the operation cylinder, a prism that changes a direction of a field of view visible through the viewfinder portion, and a prism guide lever rotatable about a second shaft. The prism guide lever includes a prism holder holding the prism, and a follower gear including a plurality of teeth meshing with the plurality of teeth in the drive gear in the drive lever. The prism holder is placeable into the viewfinder portion.

DETAILED DESCRIPTION

Figure 1:
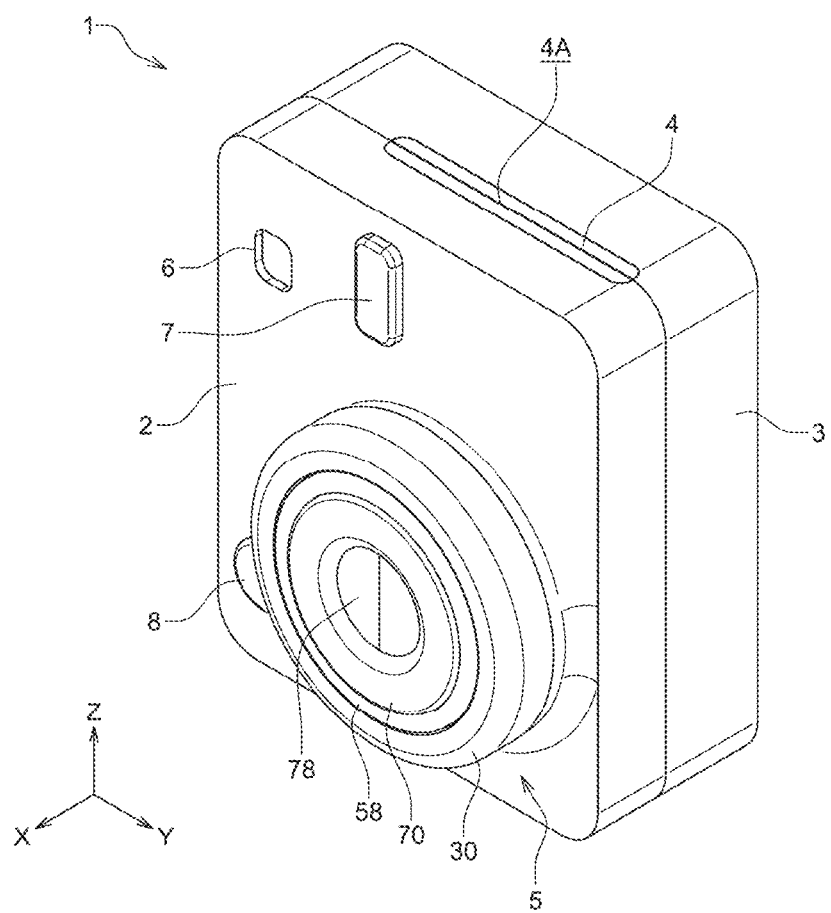
FIG. 1 is a perspective view of a camera according to one embodiment of the present invention.

A camera according to one or more embodiments of the present invention will now be described in detail with reference to FIGS. 1 to 13D. In FIGS. 1 to 13D, like reference numerals denote like or corresponding components. Such components will not be described repeatedly. In FIGS. 1 to 13D, the scale and dimensions of each component may be exaggerated, or one or more components may not be shown. Unless otherwise specified, the terms such as first and second will be used simply to distinguish the components and will not represent a specific order or sequence.

FIG. 1 is a perspective view of a camera 1 according to one embodiment of the present invention. Although the camera 1 according to the present embodiment is a camera (instant camera) that uses a photographic film to be automatically developed after shooting, the present invention is also applicable to a camera other than such an instant camera. For ease of explanation in the present embodiment, the term front or frontward refers to the positive X-direction in FIG. 1, and the term rear or rearward refers to the negative X-direction in FIG. 1.

As shown in FIG. 1, the camera 1 includes a front cover 2, a rear cover 3 attached to the rear of the front cover 2, a top cover 4 between the front cover 2 and the rear cover 3, and a lens barrel 5 accommodating a lens unit. The front cover 2 includes a viewfinder 6. A flash window 7 is located adjacent to the viewfinder 6. A release button 8 is located in the negative Z-direction from the viewfinder 6. The top cover 4 has an ejection slit 4A extending in Y-direction, through which a photographic film developed after shooting is ejected.

The lens barrel 5 in the present embodiment is extendable in an optical axis direction. The lens barrel 5 shown in FIG. 1 is retracted furthest in the optical axis direction (X-direction). The state of the camera 1 with the lens barrel 5 in the state shown in FIG. 1 is referred to as a retracted state of the camera 1.

Figure 2:
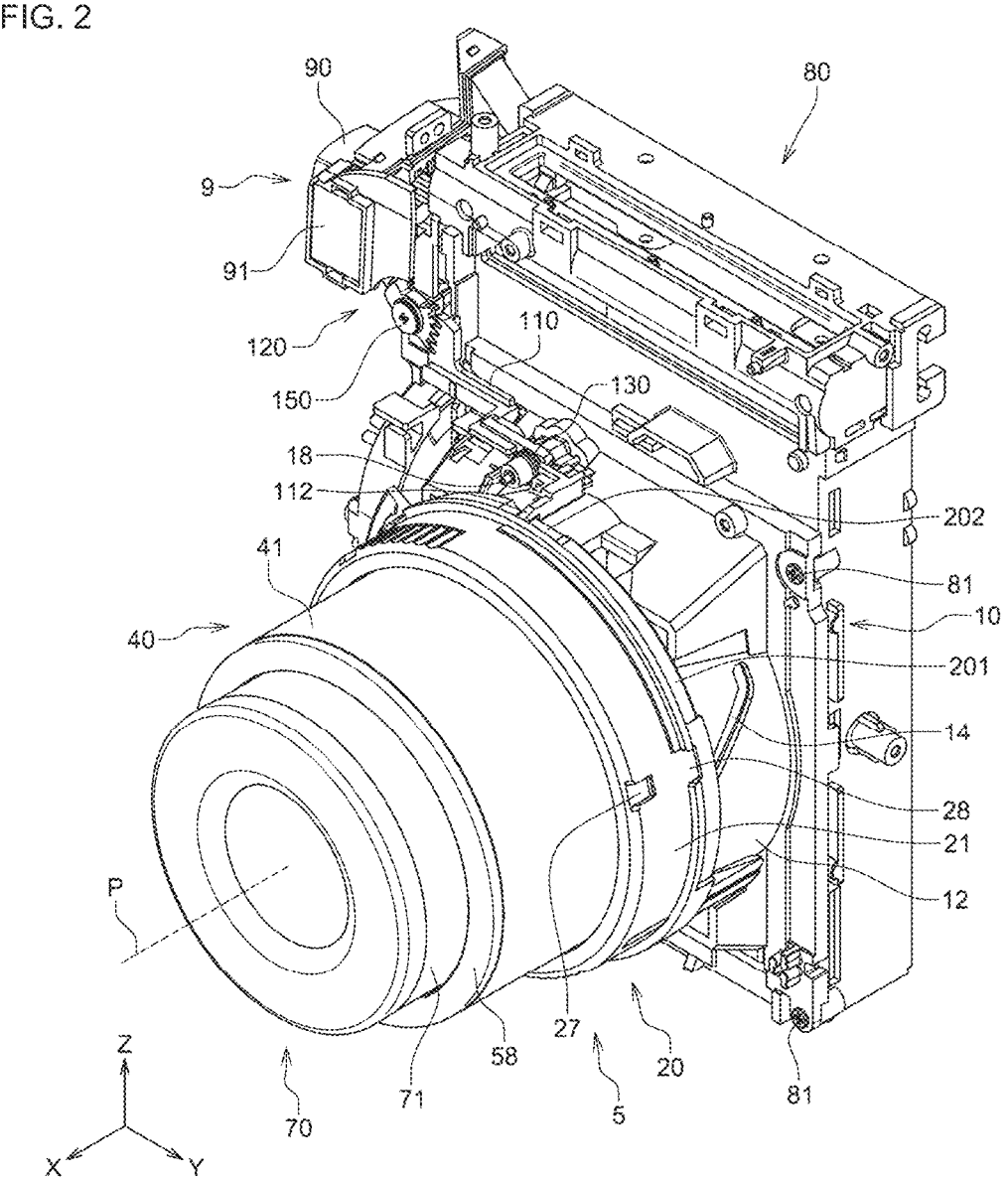
FIG. 2 is a perspective view of the camera in FIG. 1 with a lens barrel extending frontward and a front cover removed.

FIG. 2 is a perspective view of the camera showing some of the components accommodated in an internal space defined by the front cover 2, the rear cover 3, and the top cover 4, and the lens barrel 5 extending to its maximum length in a direction (X-direction) along an optical axis P. The state of the camera 1 with the lens barrel 5 in this state is referred to as a most extended state of the camera 1.

As shown in FIG. 2, a substantially rectangular frame 80 is accommodated in the internal space defined by the front cover 2, the rear cover 3, and the top cover 4. The frame 80 contains, for example, a photographic film. In addition to the lens barrel 5 described above, a viewfinder portion 9 is attached to the frame 80 to allow a user to check the field of view in front of the lens barrel 5 through the viewfinder 6.

Figure 3:
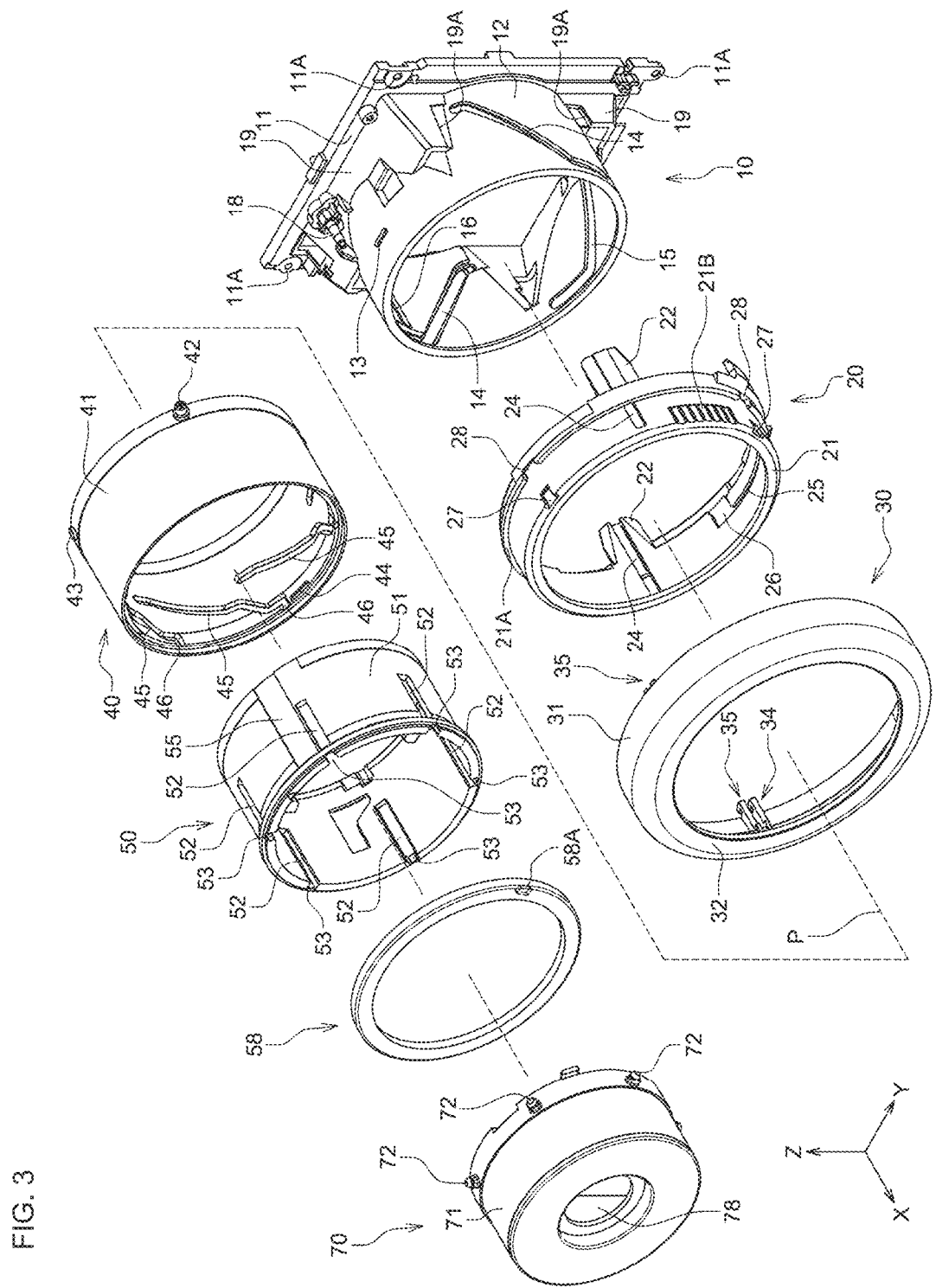
FIG. 3 is an exploded perspective view of the lens barrel in the camera in FIG. 1.

FIG. 3 is an exploded perspective view of the lens barrel 5 in the camera 1 in FIG. 1. As shown in FIG. 3, the lens barrel 5 in the present embodiment includes a stationary cylinder 10, an operation cylinder 20, a cover cylinder 30, a rotary cylinder 40, a key cylinder 50, a cover ring 58, and a linearly movable cylinder 70. The stationary cylinder 10 is attached to the front surface of the frame 80. The operation cylinder 20 is rotatable relative to the stationary cylinder 10 without moving in an axial direction. The cover cylinder 30 covers the outer circumference of the operation cylinder 20. The rotary cylinder 40 is rotatable relative to the stationary cylinder 10 and movable in the axial direction. The key cylinder 50 is movable in the axial direction together with the rotary cylinder 40 without rotating relative to the stationary cylinder 10. The cover ring 58 is attached to the front edge of the key cylinder 50. The linearly movable cylinder 70 is rotatable relative to the stationary cylinder 10 together with the key cylinder 50. In the present embodiment, the linearly movable cylinder 70 accommodates the lens unit including at least one lens (not shown). A barrier 78 that can be open and closed is located in front of the lens unit in the linearly movable cylinder 70. In the present embodiment, the rotary cylinder 40, the key cylinder 50, the cover ring 58, and the linearly movable cylinder 70 are included in an extendable unit that is extendable in the axial direction (X-direction).

As shown in FIG. 3, the operation cylinder 20 includes a cylindrical portion 21 extending in the axial direction (X-direction) and two extending portions 22 extending rearward from the cylindrical portion 21. The cylindrical portion 21 is located radially outward from the stationary cylinder 10. The cylindrical portion 21 includes, near its rear end, a flange 21A protruding radially outward. The cylindrical portion 21 has an outer circumferential surface with a knurled portion 21B to facilitate handling during assembly. The two extending portions 22 face each other across the optical axis P.

The extending portions 22 and the cylindrical portion 21 have, on their inner circumferential surfaces, axial grooves 24 extending in the axial direction (X-direction). The cylindrical portion 21 has, on its inner circumferential surface, two circumferential grooves 25 extending in a circumferential direction and two connecting grooves 26 extending in the positive X-direction from the rear edge of the cylindrical portion 21 and connecting to the ends of the corresponding circumferential grooves 25. The two axial grooves 24, the two circumferential grooves 25, and the two connecting grooves 26 are all located at intervals of 180 degrees in the circumferential direction.

The cylindrical portion 21 has three recesses 27 on its front edge and a cutout 28 in a part of the flange 21A in the negative X-direction from each recess 27. The recesses 27 and the cutouts 28 are located at intervals of 120 degrees in the circumferential direction.

As shown in FIG. 3, the stationary cylinder 10 includes abase 11 being a rectangular frame fastened to the frame 80, a cylindrical wall 12 extending frontward (in the positive X-direction) from the base 11, and two engagement tabs 13 protruding radially outward from the cylindrical wall 12. The base 11 has threaded holes 11A in its four corners. The threaded holes 11A receive screws 81 (refer to FIG. 2). The screws 81 are screwed into the frame 80 to fasten the stationary cylinder 10 to the frame 80.

Each engagement tab 13 on the stationary cylinder 10 has a width in the axial direction (X-direction) (hereafter referred to as an axial width) slightly smaller than the axial width of the corresponding circumferential groove 25 on the operation cylinder 20. The engagement tabs 13 on the stationary cylinder 10 are thus engaged with the corresponding circumferential grooves 25 on the operation cylinder 20 and movable in the circumferential direction inside the circumferential grooves 25. The operation cylinder 20 with its circumferential grooves 25 engaged with the corresponding engagement tabs 13 on the stationary cylinder 10 can thus rotate relative to the stationary cylinder 10 without changing its axial position relative to the stationary cylinder 10.

Each engagement tab 13 on the stationary cylinder 10 has a width in the circumferential direction (hereafter referred to as a circumferential width) smaller than the circumferential width of the corresponding connecting groove 26 on the operation cylinder 20. To join the operation cylinder 20 to the stationary cylinder 10, the operation cylinder 20 is moved in the negative X-direction from the front of the stationary cylinder 10 with the engagement tabs 13 on the stationary cylinder 10 aligned with the corresponding connecting grooves 26 on the operation cylinder 20 in the circumferential direction. This allows the engagement tabs 13 on the stationary cylinder 10 to move in the axial direction (X-direction) inside the corresponding connecting grooves 26 on the operation cylinder 20 to the ends of the circumferential grooves 25. The operation cylinder 20 in this state is then rotated relative to the stationary cylinder 10. This allows the engagement tabs 13 on the stationary cylinder 10 to be engaged with the corresponding circumferential grooves 25 on the operation cylinder 20.

As shown in FIG. 3, the cylindrical wall 12 of the stationary cylinder 10 has two through-cam grooves 14 extending through the cylindrical wall 12. The two through-cam grooves 14 are located at intervals of 180 degrees in the circumferential direction. Each through-cam groove 14 extends with its circumferential position gradually changing from its rear end toward its front end. Each through-cam groove 14 includes the rear end and the front end extending in the circumferential direction. The cylindrical wall 12 of the stationary cylinder 10 has, on its inner circumferential surface, two cam grooves 15 extending in shapes corresponding to the through-cam grooves 14 described above and two axial grooves 16 extending in the axial direction (X-direction). In the present embodiment, the cam grooves 15 are at the positions rotated by 90 degrees about an axis relative to the through-cam grooves 14.

The cover cylinder 30 is rotatable relative to the stationary cylinder 10 together with the operation cylinder 20 described above. As shown in FIG. 3, the cover cylinder 30 includes a cylindrical portion 31 extending in the axial direction (X-direction), an annular portion 32 extending radially inward from the front end of the cylindrical portion 31, three engagement members 34 on the inner circumferential surface of the cylindrical portion 31, and three hooks 35 each located behind the corresponding one of the three engagement members 34. In the present embodiment, the three engagement members 34 and the three hooks 35 are aligned with each other in the circumferential direction and located at intervals of 120 degrees in the circumferential direction.

Each hook 35 is engaged with the inner circumferential edge of an opening in the front cover 2. With the hooks 35 engaged with the inner circumferential edge of the opening in the front cover 2, the cover cylinder 30 is rotatable relative to the front cover 2. The engagement members 34 in the cover cylinder 30 have substantially the same circumferential width as the recesses 27 on the operation cylinder 20. Each engagement member 34 fits in (is engaged with) the corresponding recess 27 on the operation cylinder 20 in the circumferential direction. Each hook 35 has substantially the same circumferential width as the corresponding cutout 28 in the operation cylinder 20 and fits in the cutout 28 in the operation cylinder 20. This causes the cover cylinder 30 and the operation cylinder 20 to be integral with each other.

The rotary cylinder 40 is rotatable relative to the stationary cylinder 10 and movable in the axial direction. As shown in FIG. 3, the rotary cylinder 40 includes a cylindrical portion 41 extending in the axial direction (X-direction) and located radially inward from the stationary cylinder 10, two actuation portions 42 protruding radially outward near the rear end of the cylindrical portion 41, two protrusions 43 protruding radially outward near the rear end of the cylindrical portion 41, and three engagement tabs 44 protruding radially inward from the inner circumferential surface of the cylindrical portion 41.

The actuation portions 42 protrude more radially outward than the protrusions 43. For example, the actuation portions 42 may be screws received in bosses located near the rear end of the cylindrical portion 41. In the present embodiment, the actuation portions 42 and the protrusions 43 are alternately located every 90 degrees in the circumferential direction. The three engagement tabs 44 are located at intervals of 120 degrees about the axis.

Each actuation portion 42 has an outer diameter slightly smaller than the circumferential width of the corresponding through-cam groove 14 in the stationary cylinder 10 and the circumferential width of the corresponding axial groove 24 on the operation cylinder 20. Each actuation portion 42 is thus engaged with the corresponding axial groove 24 on the operation cylinder 20 through the corresponding through-cam groove 14 in the stationary cylinder 10. Each protrusion 43 has an outer diameter smaller than the circumferential width of the corresponding cam groove 15 on the stationary cylinder 10 and is thus movable inside the cam groove 15 on the stationary cylinder 10.

In this structure, the actuation portions 42 of the rotary cylinder 40 are movable inside and along the corresponding through-cam grooves 14 in the stationary cylinder 10 while being engaged with the through-cam grooves 14 in the stationary cylinder 10 and also movable in the axial direction inside the corresponding axial grooves 24 on the operation cylinder 20 while being engaged with the axial grooves 24 on the operation cylinder 20. When the operation cylinder 20 rotates relative to the stationary cylinder 10, the rotary cylinder 40 with its actuation portions 42 engaged with the corresponding axial grooves 24 on the operation cylinder 20 rotates relative to the stationary cylinder 10 together with the operation cylinder 20. The rotary cylinder 40 with its actuation portions 42 engaged with the corresponding through-cam grooves 14 in the stationary cylinder 10 also moves in X-direction relative to the stationary cylinder 10 along the shape of the through-cam grooves 14 as the rotary cylinder 40 rotates. In this manner, when the operation cylinder 20 rotates relative to the stationary cylinder 10, the rotary cylinder 40 rotates relative to the stationary cylinder 10 and also extends in the positive X-direction. As the actuation portions 42 of the rotary cylinder 40 move along the corresponding through-cam grooves 14 in the stationary cylinder 10, the protrusions 43 on the rotary cylinder 40 move in the corresponding cam grooves 15 on the stationary cylinder 10. The protrusions 43 on the rotary cylinder 40 and the cam grooves 15 on the stationary cylinder 10 engaged with each other supplementarily support the rotary cylinder 40 inside the stationary cylinder 10.

As shown in FIG. 3, the cylindrical portion 41 of the rotary cylinder 40 has, on its inner circumferential surface, six cam grooves 45 and six connecting grooves 46. The cam grooves 45 extend with their circumferential positions gradually changing from their rear ends toward their front ends. The connecting grooves 46 extend in the negative X-direction from the front edge of the rotary cylinder 40 and connect to the front ends of the corresponding cam grooves 45. The six cam grooves 45 and the six connecting grooves 46 are located at intervals of 60 degrees about the axis.

As shown in FIG. 3, the key cylinder 50 includes a cylindrical portion 51 extending in the axial direction (X-direction). The cylindrical portion 51 of the key cylinder 50 is located radially inward from the cylindrical portion 41 of the rotary cylinder 40. The cylindrical portion 51 of the key cylinder 50 has six axial grooves 52 extending in the axial direction (X-direction) through the cylindrical portion 51 and six connecting grooves 53 extending in the negative X-direction from the front edge of the cylindrical portion 51 and connecting to the ends of the corresponding axial grooves 52. The six axial grooves 52 and the six connecting grooves 53 are all located at intervals of 60 degrees in the circumferential direction.

The cylindrical portion 51 of the key cylinder 50 has, on its outer circumferential surface, three circumferential grooves (not shown) extending in the circumferential direction near the front edge of the cylindrical portion 51 and three connecting grooves 55 extending in the positive X-direction from the rear edge of the cylindrical portion 51 and connecting to the ends of the corresponding circumferential grooves. The three connecting grooves 55 and the three circumferential grooves are all located at intervals of 120 degrees in the circumferential direction.

Each circumferential groove on the key cylinder 50 has an axial width slightly greater than the axial width of the corresponding engagement tab 44 on the rotary cylinder 40. The engagement tabs 44 on the rotary cylinder 40 are thus engaged with the corresponding circumferential grooves on the key cylinder 50 and movable in the circumferential direction inside the corresponding circumferential grooves. The key cylinder 50 with its circumferential grooves engaged with the corresponding engagement tabs 44 on the rotary cylinder 40 can thus rotate relative to the rotary cylinder 40 without changing its axial position relative to the rotary cylinder 40.

Each connecting groove 55 on the key cylinder 50 has a circumferential width greater than the circumferential width of the corresponding engagement tab 44 on the rotary cylinder 40. To join the key cylinder 50 to the rotary cylinder 40, the key cylinder 50 is moved in the negative X-direction from the front of the rotary cylinder 40 with the engagement tabs 44 on the rotary cylinder 40 aligned with the corresponding connecting grooves 55 on the key cylinder 50 in the circumferential direction. This allows the engagement tabs 44 on the rotary cylinder 40 to move in the axial direction (X-direction) inside the corresponding connecting grooves 55 on the key cylinder 50 to the ends of the circumferential grooves. The key cylinder 50 in this state is then rotated relative to the rotary cylinder 40. This allows the engagement tabs 44 on the rotary cylinder 40 to be engaged with the corresponding circumferential grooves on the key cylinder 50.

The key cylinder 50 includes engagement members (not shown) engaged with the corresponding axial grooves 16 on the stationary cylinder 10. These engagement members are engaged with the corresponding axial grooves 16 on the stationary cylinder 10 and movable in the axial direction inside the axial grooves 16. The key cylinder 50 thus does not rotate relative to the stationary cylinder 10, but can move in the axial direction together with the rotary cylinder 40 while rotating relative to the rotary cylinder 40.

As shown in FIG. 3, the linearly movable cylinder 70 includes a cylindrical portion 71 located radially inward from the key cylinder 50 and six cylindrical actuation portions 72 protruding radially outward from its outer circumferential surface. The actuation portions 72 are located at equal intervals in the circumferential direction. Each actuation portion 72 has an outer diameter slightly smaller than the circumferential widths of the corresponding axial groove 52 and the corresponding connecting groove 53 on the key cylinder 50 and the circumferential widths of the corresponding connecting groove 46 and the corresponding cam groove 45 on the rotary cylinder 40. Each actuation portion 72 is thus engaged with the corresponding cam groove 45 on the rotary cylinder 40 through the corresponding axial groove 52 in the key cylinder 50.

The key cylinder 50 does not rotate relative to the stationary cylinder 10 with the engagement between the engagement members described above and the axial grooves 16 on the stationary cylinder 10. In contrast, the rotary cylinder 40 is rotatable relative to the stationary cylinder 10. Thus, when the rotary cylinder 40 rotates relative to the stationary cylinder 10, the linearly movable cylinder 70 with its actuation portions 72 engaged with the corresponding cam grooves 45 on the rotary cylinder 40 moves in X-direction relative to the rotary cylinder 40 along the shape of the cam grooves 45. In this manner, the linearly movable cylinder 70 can extend in the positive X-direction from the rotary cylinder 40 as the rotary cylinder 40 rotates relative to the stationary cylinder 10.

To join the linearly movable cylinder 70 to the key cylinder 50, the rotary cylinder 40 is rotated relative to the key cylinder 50 to align the connecting grooves 46 on the rotary cylinder 40 with the corresponding connecting grooves 53 on the key cylinder 50 in the circumferential direction after the key cylinder 50 is joined to the rotary cylinder 40 in the manner described above. The linearly movable cylinder 70 is then moved in the negative X-direction from the fronts of the rotary cylinder 40 and the key cylinder 50 with the actuation portions 72 of the linearly movable cylinder 70 aligned with the corresponding connecting grooves 53 and 46 in the circumferential direction. This allows the actuation portions 72 of the linearly movable cylinder 70 to move from the corresponding connecting grooves 53 into the corresponding axial grooves 52 in the key cylinder 50 as well as from the corresponding connecting grooves 46 into the corresponding cam grooves 45 on the rotary cylinder 40. This allows the actuation portions 72 of the linearly movable cylinder 70 to be engaged with the corresponding axial grooves 52 in the key cylinder 50 and with the corresponding cam grooves 45 on the rotary cylinder 40.

In the present embodiment, as described above, the key cylinder 50 has the connecting grooves 53 on its front edge to guide the actuation portions 72 of the linearly movable cylinder 70 into the corresponding axial grooves 52 in the key cylinder 50, and the rotary cylinder 40 has the connecting grooves 46 on its front edge to guide the actuation portions 72 of the linearly movable cylinder 70 into the corresponding cam grooves 45 on the rotary cylinder 40. For the appearance of the product, the connecting grooves 53 and 46 are not to be exposed outside. The cover ring 58 is thus attached to the key cylinder 50 to cover the front edges of the key cylinder 50 and the rotary cylinder 40. For example, the cover ring 58 can be attached to the key cylinder 50 by fitting a projection 58A (refer to FIG. 3) on the rear surface of the cover ring 58 into one of the connecting grooves 53 on the key cylinder 50.

In the above embodiment, when the user rotates the cylindrical portion 31 of the cover cylinder 30 relative to the stationary cylinder 10 in the retracted state of the camera 1 shown in FIG. 1, the operation cylinder 20 rotates integrally with the cover cylinder 30. This causes the rotary cylinder 40 with its actuation portions 42 engaged with the corresponding axial grooves 24 on the operation cylinder 20 as well as with the corresponding through-cam grooves 14 in the stationary cylinder 10 to rotate integrally with the operation cylinder 20 and also to move in the axial direction along the shape of the through-cam grooves 14 in the stationary cylinder 10. This causes the linearly movable cylinder 70 with its actuation portions 72 engaged with the corresponding axial grooves 52 in the key cylinder 50 as well as with the corresponding cam grooves 45 on the rotary cylinder 40 to move in the axial direction along the shape of the cam grooves 45 on the rotary cylinder 40 without rotating relative to the stationary cylinder 10. In this manner, both the rotary cylinder 40 and the linearly movable cylinder 70 in the lens barrel 5 can be extended in the axial direction. In the retracted state and the most extended state, each extending portion 22 of the operation cylinder 20 is in contact with an edge 19A of the corresponding mount 19 on the base 11 in the stationary cylinder 10 (refer to FIG. 3), thus restricting further rotation of the operation cylinder 20.

Figure 4:
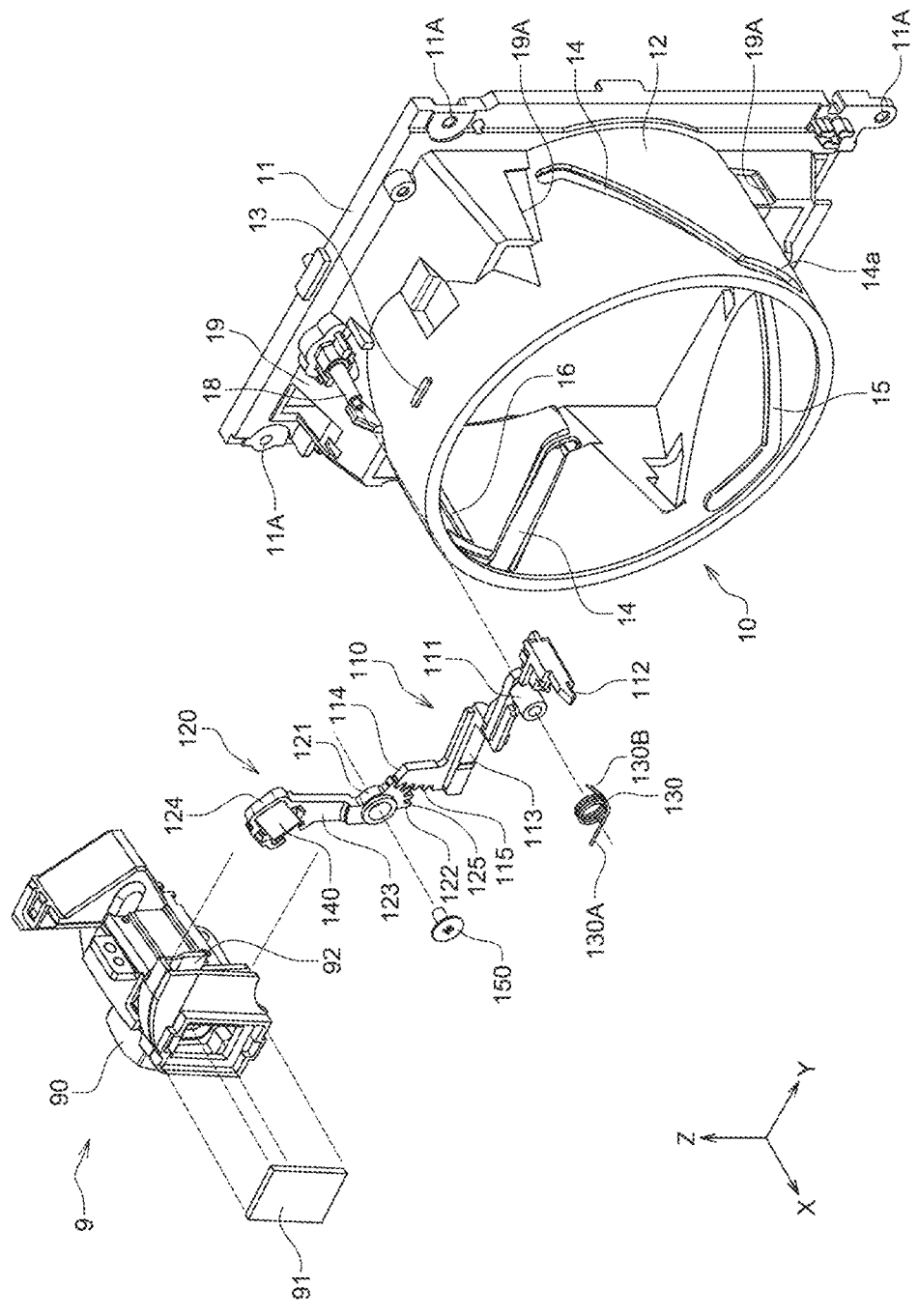
FIG. 4 is an exploded perspective view of some of the components shown in FIG. 2.

FIG. 4 is an exploded perspective view of some of the components shown in FIG. 2. As shown in FIG. 4, the stationary cylinder 10 includes a shaft 18 (first shaft) extending in the positive X-direction from the base 11. A drive lever 110 is attached to the shaft 18. A prism guide lever 120 is located adjacent to the drive lever 110. The prism guide lever 120 receives a prism 140 for changing the direction of the field of view visible through the viewfinder portion 9.

Referring back to FIG. 2, the operation cylinder 20 attached to the stationary cylinder 10 includes, on the rear edge of the cylindrical portion 21, a guide surface 201 extending in the circumferential direction. A recess 202 with a predetermined depth is adjacent to the guide surface 201 in the circumferential direction. In other words, the recess 202 has a bottom surface having an outer diameter smaller than the outer diameter of the guide surface 201 and serves as a lever drive for driving the drive lever 110 as described later.

Figure 5A:
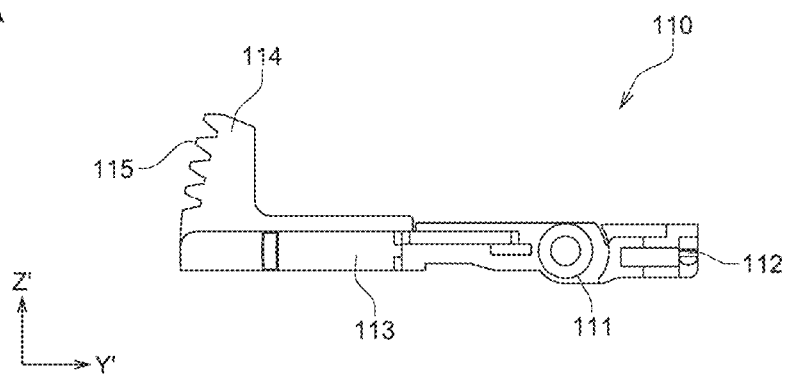
FIG. 5A is a front view of a drive lever shown in FIG. 4.
Figure 5B:
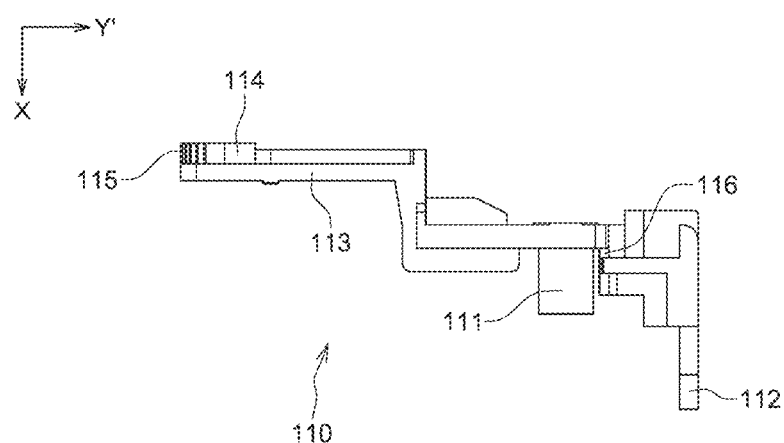
FIG. 5B is a plan view of the drive lever shown in FIG. 5A.
Figure 5C:
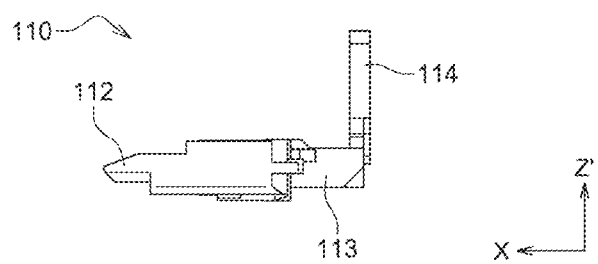
FIG. 5C is a right side view of the drive lever shown in FIG. 5A.

FIG. 5A is a front view of the drive lever 110. FIG. 5B is a plan view of the drive lever 110. FIG. 5C is a right side view of the drive lever 110. As shown in FIGS. 5A to 5C, the drive lever 110 includes a cylinder 111 extending in the positive X-direction, an actuation portion 112 located radially outward from the cylinder 111 and extending in the positive X-direction, an arm 113 extending from the cylinder 111, and a drive gear 114 at an end of the arm 113. The drive gear 114 includes multiple teeth 115 arranged in the circumferential direction.

The shaft 18 in the stationary cylinder 10 is placed through the cylinder 111 in the drive lever 110, allowing the drive lever 110 to be rotatable about the shaft 18. With the drive lever 110 attached to the shaft 18 in the stationary cylinder 10, the actuation portion 112 extending in the positive X-direction has its distal end located radially outward from the guide surface 201 of and the recess 202 in the operation cylinder 20 as shown in FIG. 2.

As shown in FIG. 4, an urging spring 130 (urging member) being a helical torsion spring is placed around the cylinder 111 in the drive lever 110. The urging spring 130 includes one arm 130A engaged with one of the mounts 19 on the base 11 in the stationary cylinder 10 and another arm 130B engaged with an engagement member 116 (refer to FIG. 5B) in the drive lever 110. The urging spring 130 is placed around the cylinder 111 to have an opening angle between the arms 130A and 130B smaller than the free angle of the urging spring 130. The urging spring 130 urges the actuation portion 112 in the drive lever 110 toward the guide surface 201 of and the recess 202 in the operation cylinder 20. In the illustrated example, the urging spring 130 is a helical torsion spring, but may be another spring (e.g., a leaf spring).

Figure 6A:
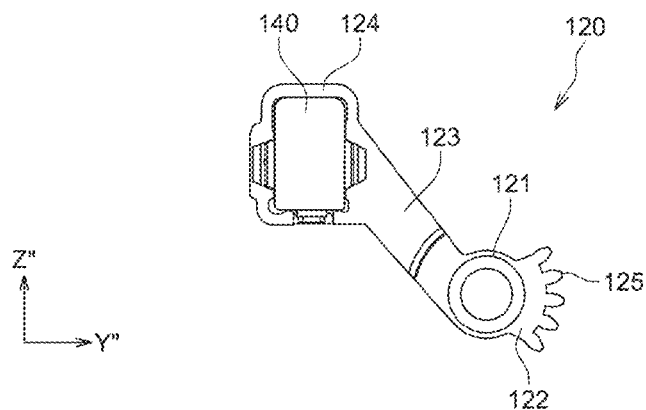
FIG. 6A is a front view of a prism guide lever receiving a prism shown in FIG. 4.
Figure 6B:
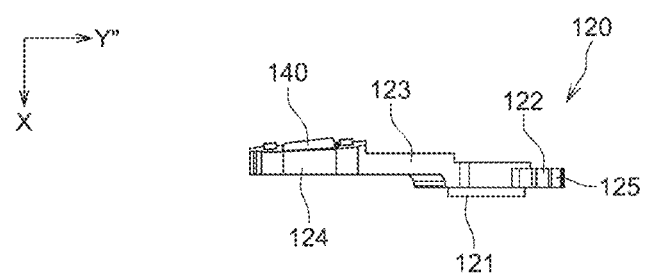
FIG. 6B is a plan view of the prism and the prism guide lever shown in FIG. 6A.
Figure 6C:
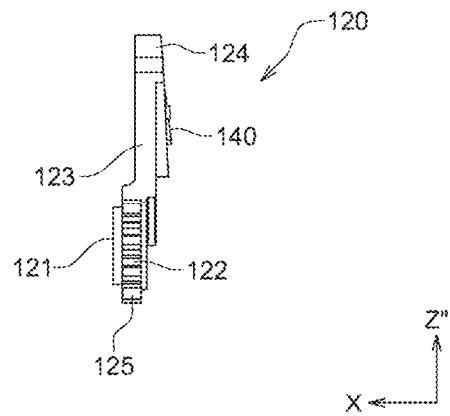
FIG. 6C is a right side view of the prism and the prism guide lever shown in FIG. 6A.

FIG. 6A is a front view of the prism guide lever 120 receiving the prism 140. FIG. 6B is a plan view of the prism guide lever 120 receiving the prism 140. FIG. 6C is a right side view of the prism guide lever 120 receiving the prism 140. As shown in FIGS. 6A to 6C, the prism guide lever 120 includes a cylinder 121 extending in X-direction, a follower gear 122 located radially outward from the cylinder 121, an arm 123 extending from the cylinder 121, and a prism holder 124 at an end of the arm 123 for holding the prism 140. The follower gear 122 includes multiple teeth 125 arranged in the circumferential direction. The teeth 125 in the follower gear 122 mesh with the teeth 115 in the drive gear 114 in the drive lever 110.

The cylinder 121 in the prism guide lever 120 receives a shaft 150 (refer to FIG. 4) being, for example, a screw. The shaft 150 is fastened to the frame 80. The cylinder 121 has an inner diameter greater than the outer diameter of the shaft 150, allowing the prism guide lever 120 to be rotatable about the shaft 150 (second shaft).

As shown in FIG. 4, the viewfinder portion 9 includes a housing 90 accommodating a Porro prism and a lens (both not shown) and a cover 91 attached to the front surface of the housing 90. The housing 90 has an opening 92 being open in the positive Y-direction.

A part of the arm 123 and the prism holder 124 in the prism guide lever 120 are placed inside the housing 90 through the opening 92 in the housing 90 of the viewfinder portion 9. This allows the prism holder 124 and the prism 140 held by the prism holder 124 to be located inside the housing 90 of the viewfinder portion 9.

In this structure, the prism guide lever 120 with the teeth 125 in its follower gear 122 meshing with the teeth 115 in the drive gear 114 in the drive lever 110 rotates about the shaft 150 as the drive lever 110 rotates about the shaft 18 in the stationary cylinder 10. This causes the prism 140 held by the prism holder 124 to swing about the shaft 150. This operation will now be described in more detail.

Figure 7:
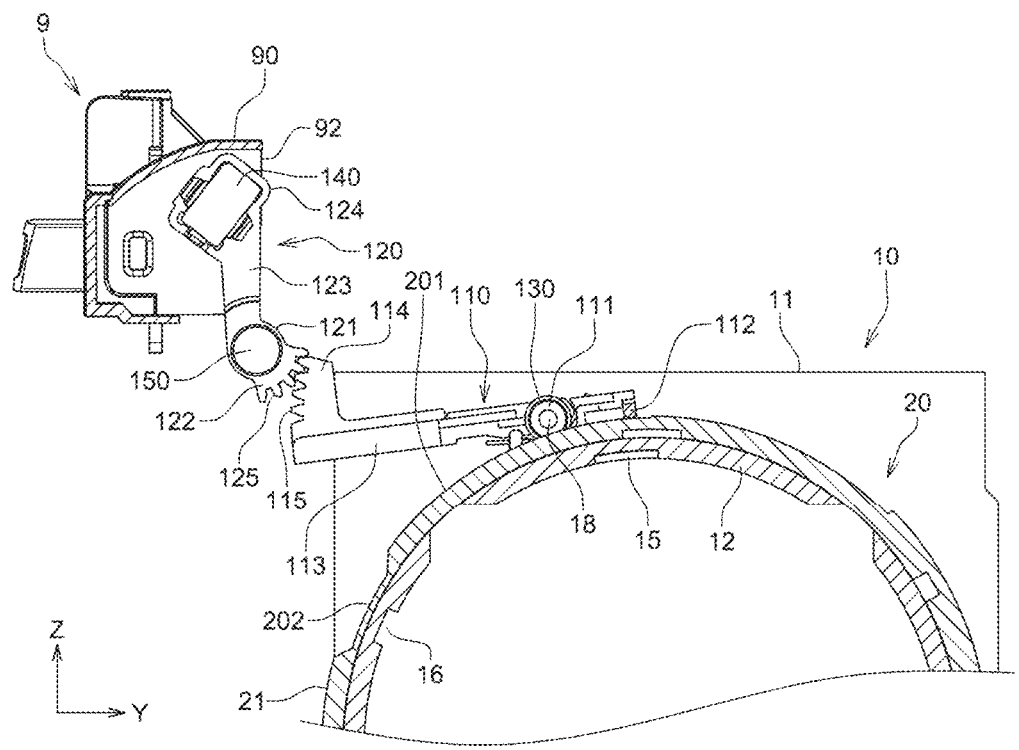
FIG. 7 is a schematic sectional view of the camera in FIG. 1 in a retracted state.
Figure 8:
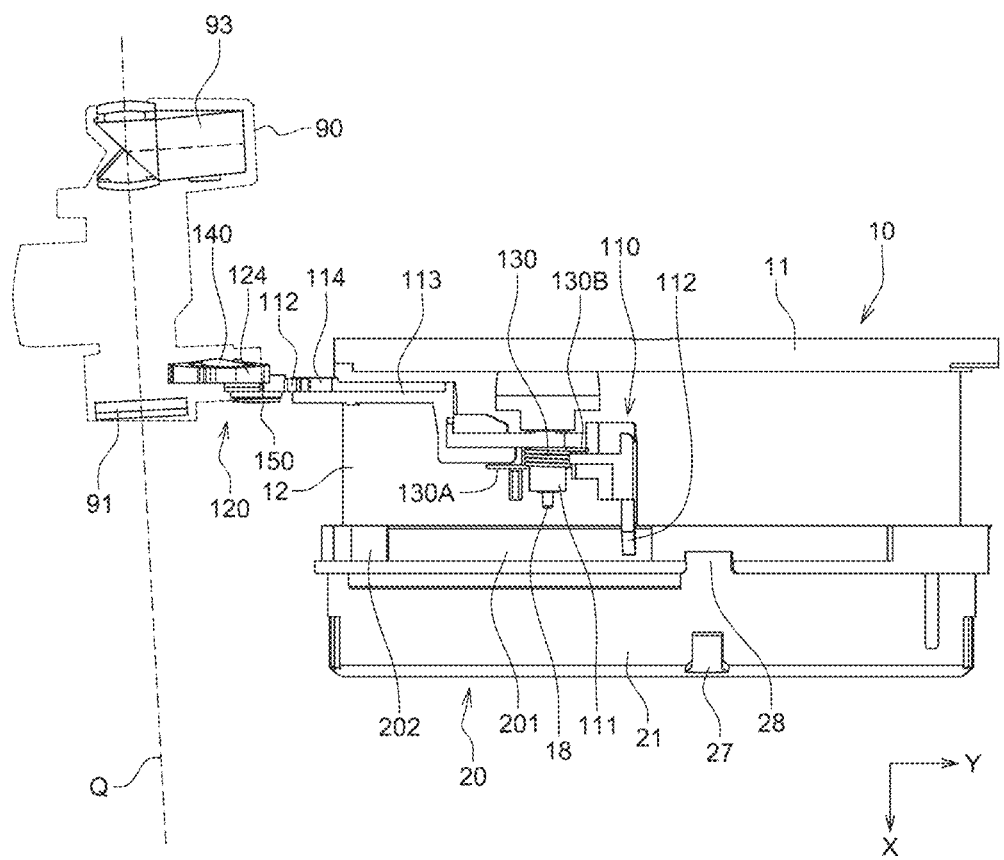
FIG. 8 is a schematic plan view of the camera in FIG. 1 in the retracted state.

FIG. 7 is a schematic sectional view of the camera 1 in the retracted state. FIG. 8 is a schematic plan view of the camera 1 in the retracted state. As shown in FIGS. 7 and 8, when the camera 1 is in the retracted state, or in the state in FIG. 1, the actuation portion 112 in the drive lever 110 is on the guide surface 201 of the operation cylinder 20 and pressed against the guide surface 201 of the operation cylinder 20 under an urging force from the urging spring 130. In this state, the prism guide lever 120 with its follower gear 122 meshing with the drive gear 114 in the drive lever 110 is held at a position off an optical path Q in the viewfinder portion 9 as shown in FIG. 8.

When the user rotates the cover cylinder 30 and the operation cylinder 20 relative to the stationary cylinder 10 in the retracted state, the rotary cylinder 40 in the lens barrel 5 rotates relative to the stationary cylinder 10 and also extends in the positive X-direction, causing the linearly movable cylinder 70 to extend in the positive X-direction without rotating relative to the stationary cylinder 10, as described above. In this state, the user can perform a normal photographing operation. The state of the camera 1 with the lens barrel 5 in this state is referred to as a half-extended state of the camera 1.

Figure 9:
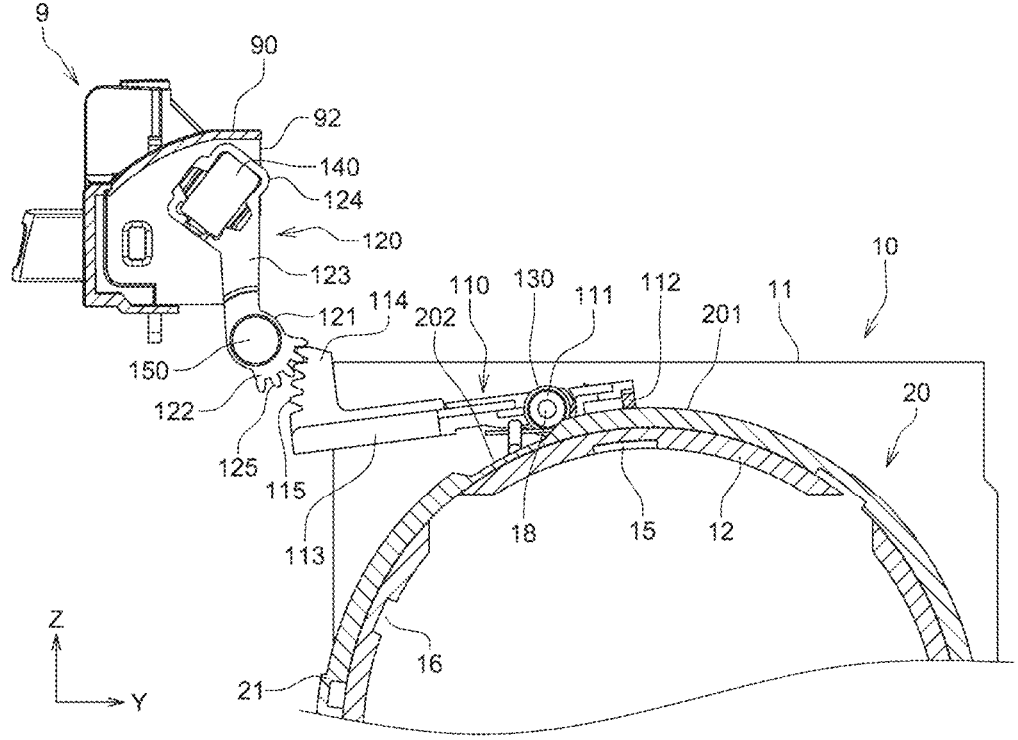
FIG. 9 is a schematic sectional view of the camera in FIG. 1 in a half-extended state.

FIG. 9 is a schematic sectional view of the camera 1 in the half-extended state. As shown in FIG. 9, when the camera 1 is in the half-extended state, the actuation portion 112 in the drive lever 110 remains on the guide surface 201 of the operation cylinder 20, and the drive lever 110 and the prism guide lever 120 are at the same positions as when the camera 1 is in the retracted state. The prism guide lever 120 is thus held at the position off the optical path Q in the viewfinder portion 9. In this state, the user can look through an eyepiece (not shown) in the viewfinder portion 9 and capture an image of an object while viewing the field of view centered on the regular optical path Q.

In the half-extended state, the actuation portions 42 of the rotary cylinder 40 are at the front ends 14a (refer to FIG. 4) of the corresponding through-cam grooves 14 in the stationary cylinder 10 extending in the circumferential direction. When the user further rotates the cover cylinder 30 and the operation cylinder 20 relative to the stationary cylinder 10 in the half-extended state, the rotary cylinder 40 in the lens barrel 5 rotates relative to the stationary cylinder 10, but no longer extends in the positive X-direction, causing the linearly movable cylinder 70 alone to extend in the positive X-direction. This places the camera 1 in the most extended state described above. In this state, the user can perform a short-distance photographing (macro photographing) operation.

Figure 10:
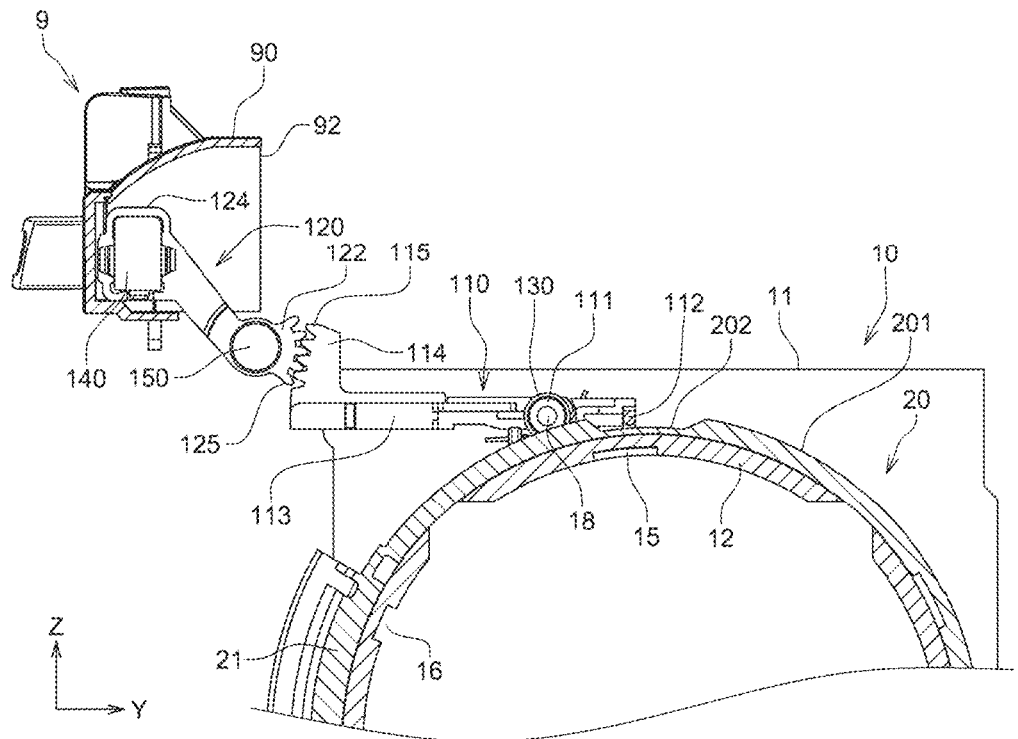
FIG. 10 is a schematic sectional view of the camera in FIG. 1 in a most extended state.
Figure 11:
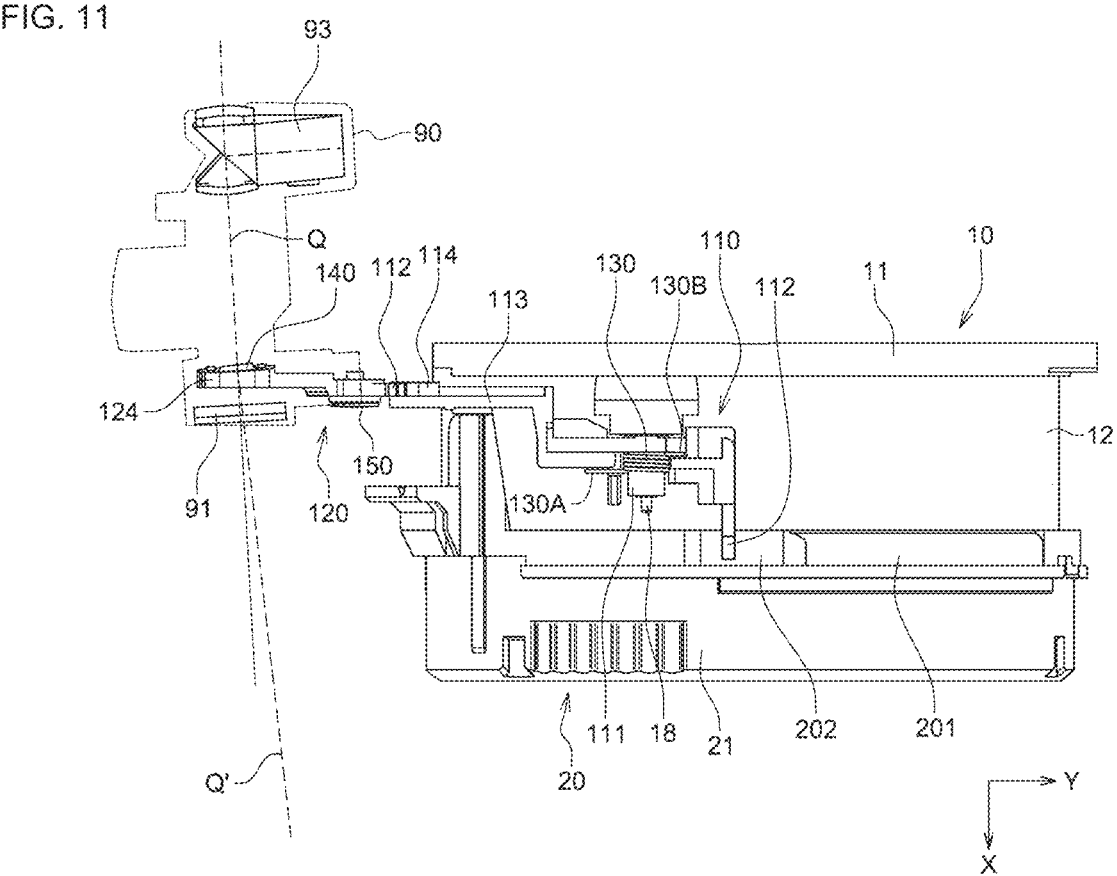
FIG. 11 is a schematic plan view of the camera in FIG. 1 in the most extended state.

FIG. 10 is a schematic sectional view of the camera 1 in the most extended state. FIG. 11 is a schematic plan view of the camera 1 in the most extended state. As shown in FIGS. 10 and 11, the actuation portion 112 in the drive lever 110 being on the guide surface 201 of the operation cylinder 20 moves onto the recess 202 in the operation cylinder 20 as the camera 1 in the half-extended state enters the most extended state. The recess 202 in the operation cylinder 20 has the bottom surface having the outer diameter smaller than the outer diameter of the guide surface 201. The actuation portion 112 in the drive lever 110 thus moves in the negative Z-direction under an urging force from the urging spring 130. This causes the drive lever 110 to rotate clockwise in FIG. 10 about the shaft 18 in the stationary cylinder 10. This causes the prism guide lever 120 with the follower gear 122 meshing with the drive gear 114 in the drive lever 110 to rotate counterclockwise in FIG. 10. The prism holder 124 in the prism guide lever 120 eventually comes in contact with the inner surface of the housing 90 of the viewfinder portion 9 as shown in FIG. 10 to restrain rotation of the prism guide lever 120.

In this state, the prism 140 held by the prism holder 124 in the prism guide lever 120 is placed on the optical path Q in the viewfinder portion 9 as shown in FIG. 11. The prism 140 changes the optical path Q to an optical path Q' in the viewfinder portion 9, changing the direction of the field of view visible through the viewfinder portion 9. In the present embodiment, a short-distance photographing operation is performed in the most extended state, and thus the field of view is changed to allow observation of an area closer to the lens barrel 5 in the camera 1.

In the present embodiment, as described above, when the operation cylinder 20 is rotated to extend the extendable unit with the actuation portion 112 in the drive lever 110 urged by the urging spring 130 toward the guide surface 201 of the operation cylinder 20 and in contact with the guide surface 201, the actuation portion 112 in the drive lever 110 moves to the recess 202 adjacent to the guide surface 201. This causes the drive lever 110 to rotate about the shaft 18 under an urging force applied from the urging spring 130 to the drive lever 110 due to the difference between the outer diameter of the guide surface 201 and the outer diameter of the recess 202. As the drive lever 110 rotates, the prism guide lever 120 with its follower gear 122 meshing with the drive gear 114 in the drive lever 110 swings about the shaft 150. As the prism guide lever 120 swings, the prism 140 held by the prism holder 124 in the prism guide lever 120 is placed into the viewfinder portion 9, allowing the prism 140 to change the direction of the field of view visible through the viewfinder portion 9. In the structure in the present embodiment described above, the field of view visible through the viewfinder portion 9 can be easily changed depending on the extended state of the lens barrel 5.

The prism 140 may be fixed to the prism holder 124 in the prism guide lever 120 with an adhesive. In this case, the adhesive may adhere to the lens surfaces of the prism 140, causing an image observed through the prism 140 to be less visible. In the present embodiment, the prism 140 is fastened to the prism holder 124 in the prism guide lever 120 without an adhesive. The fastener structure for the prism 140 in the present embodiment will now be described.

Figure 12:
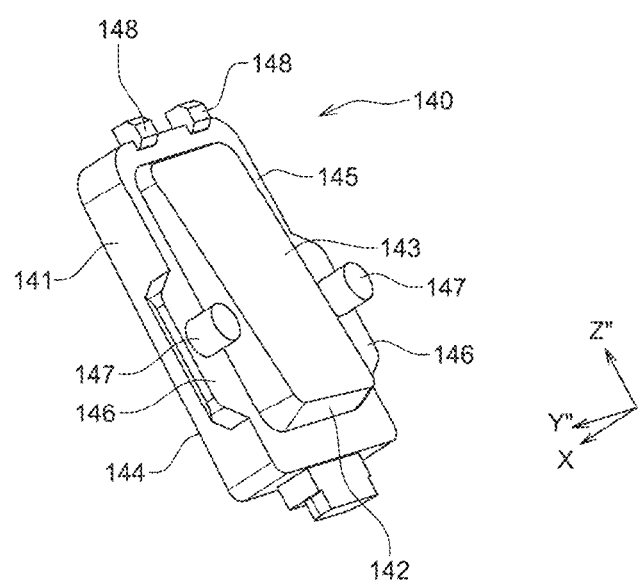
FIG. 12 is a perspective view of the prism shown in FIG. 4.

FIG. 12 is a perspective view of the prism 140. As shown in FIG. 12, the prism 140 includes a substantially rectangular base 141 and a mount 142 protruding in the negative X-direction from the base 141. The mount 142 has an inclined lens surface 143 (first lens surface). The base 141 has a lens surface 144 (second lens surface) opposite to the lens surface 143. The base 141 has a peripheral edge 145 extending outward from the mount 142. The peripheral edge 145 includes extensions 146 that are portions of enlarged widths in Y"-direction on both sides of the mount 142.

The prism 140 includes two bosses 147 extending in the negative X-direction (first direction) from the corresponding extensions 146 in the peripheral edge 145 and two projections 148 protruding in the positive Z"-direction (second direction) and in the negative X-direction from the edge of the peripheral edge 145 in the positive Z"-direction. The two bosses 147 are located on both sides of the mount 142 in Y"-direction (third direction).

In the present embodiment, the peripheral edge 145 of the prism 140 and the lens surface 143 of the mount 142 have a step between them. In this manner, the bosses 147 and the projections 148 are located on surfaces different from the lens surface 143. The lens surface 143 of the mount 142 can thus be formed with high accuracy.

Figure 13A:
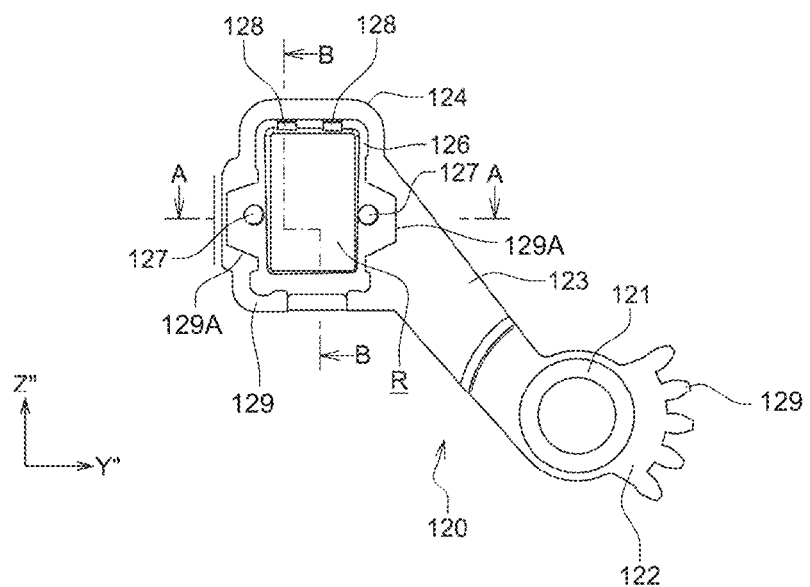
FIG. 13A is a front view of the prism guide lever shown in FIG. 4.
Figure 13B:
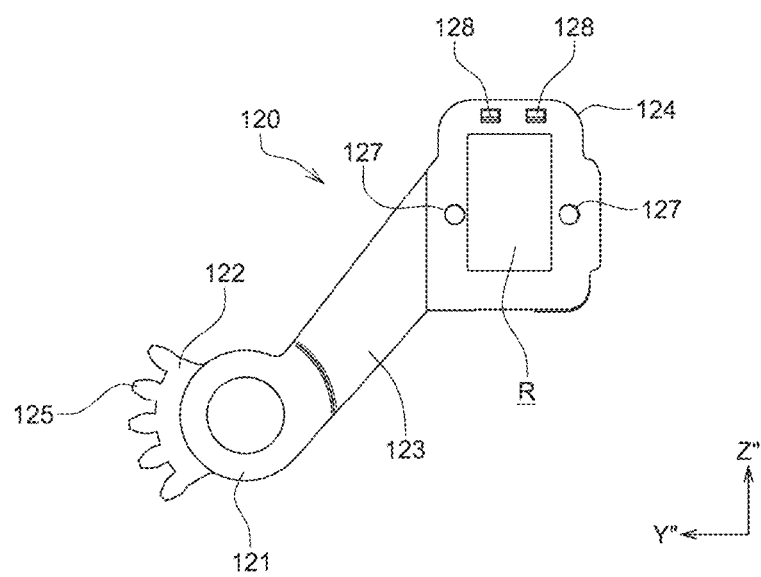
FIG. 13B is a rear view of the prism guide lever shown in FIG. 13A.
Figure 13C:
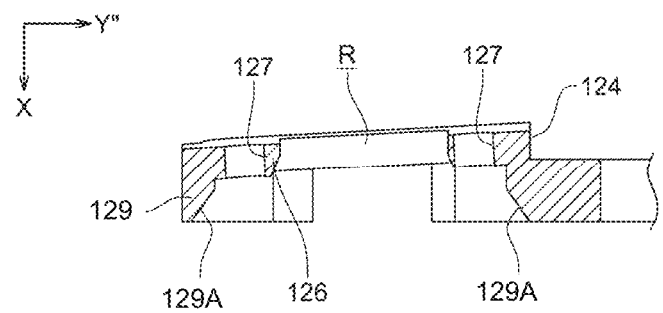
FIG. 13C is a sectional view taken along line A-A in FIG. 13A.
Figure 13D:
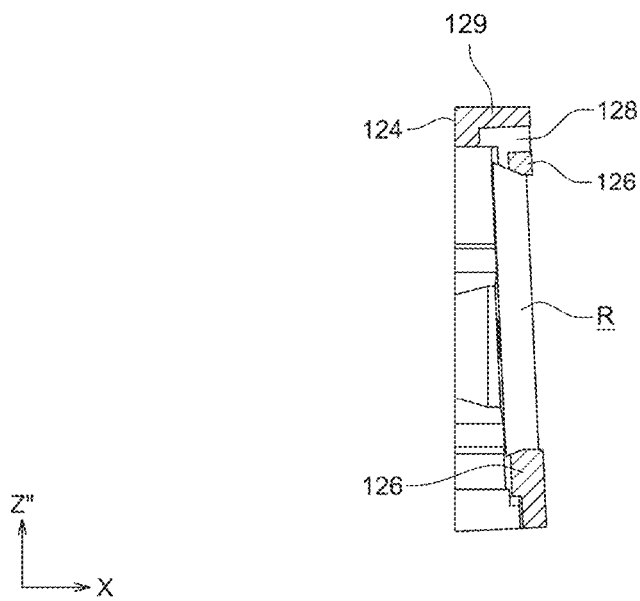
FIG. 13D is a sectional view taken along line B-B in FIG. 13A.

FIG. 13A is a front view of the prism guide lever 120. FIG. 13B is a rear view of the prism guide lever 120. FIG. 13C is a sectional view taken along line A-A in FIG. 13A. FIG. 13D is a sectional view taken along line B-B in FIG. 13A. As shown in FIGS. 13A to 13D, the prism holder 124 in the prism guide lever 120 includes a side wall 129 surrounding the prism 140 and a facing portion 126 extending inward from the side wall 129 and facing the peripheral edge 145 of the prism 140. The facing portion 126 has an opening R for receiving the mount 142 on the prism 140.

The facing portion 126 of the prism holder 124 has two insertion holes 127 for receiving the corresponding bosses 147 in the prism 140. Although the insertion holes 127 extend through the facing portion 126 in the present embodiment, the insertion holes 127 may not extend through the facing portion 126. The side wall 129 of the prism holder 124 has cutouts 129A corresponding to the extensions 146 in the prism 140.

The facing portion 126 and the side wall 129 of the prism holder 124 have engagement holes 128 engaged with the corresponding projections 148 on the prism 140. Although the engagement holes 128 extend through the facing portion 126 in the present embodiment, the engagement holes 128 may not extend through the facing portion 126.

To fasten the prism 140 to the prism guide lever 120, the prism 140 is inclined and placed into the opening R, and the projections 148 on the prism 140 are engaged with the corresponding engagement holes 128 in the prism holder 124. The bosses 147 in the prism 140 are then placed into the corresponding insertion holes 127 in the prism holder 124 to fasten the prism 140 to the prism holder 124 in the prism guide lever 120.

In this structure, the prism 140 is attached to the prism holder 124 in the prism guide lever 120 by simply engaging the projections 148 on the prism 140 with the corresponding engagement holes 128 in the prism holder 124 in the prism guide lever 120 and placing the bosses 147 in the prism 140 into the corresponding insertion holes 127 in the prism holder 124. The prism 140 can thus be attached to the prism guide lever 120 without an adhesive. This structure thus avoids an adhesive adhering to the lens surfaces 143 and 144 of the prism 140 and causing an image observed through the prism 140 to be less visible.

In the present embodiment, the pair of bosses 147 are located on both sides of the lens surface 143 in Y"-direction. This allows the prism 140 to be fastened to the prism guide lever 120 more firmly. The projections 148 on the prism 140 are adjacent to each other. This allows the prism 140 to be fastened to the prism guide lever 120 more firmly. The prism 140 may include any number of projections 148 other than those illustrated (two projections). The prism 140 may include a single projection 148, or may include three or more projections 148.

Although the recess 202 adjacent to the guide surface 201 of the operation cylinder 20 serves as a lever drive for driving the drive lever 110 in the present embodiment, a projection having an outer diameter greater than the outer diameter of the guide surface 201 may be adjacent to the guide surface 201 of the operation cylinder 20 to drive the drive lever 110. In this case, the drive lever 110 and the prism guide lever 120 are to be located to cause the prism guide lever 120 to rotate counterclockwise in FIG. 10 when the actuation portion 112 in the drive lever 110 comes in contact with the projection and is lifted.

Although the drive lever 110 is attached to the shaft 18 in the stationary cylinder 10 in the present embodiment, the structure is not limited to this example. For example, the drive lever 110 may be attached to a shaft included in the frame 80.

Although the extendable unit in the present embodiment includes the rotary cylinder 40, the key cylinder 50, the cover ring 58, and the linearly movable cylinder 70 and extends and retracts in two steps (the half-extended state and the most extended state), the extendable unit may extend and retract continuously (in other words, in a single step), or may extend and retract in three or more steps.

The directional terms such as above, below, upward, downward, upper, lower, front, frontward, rear, rearward, and the width herein simply refer to relative positional relationships between components in the embodiment described above, and do not refer to any absolute positional relationships. These terms may refer to different directions for the camera placed at positions or in orientations other than described herein.

As described above, a camera according to one aspect of the present invention can change the field of view through a viewfinder depending on the extended state of a lens barrel. The camera includes a housing having a front surface with a viewfinder, a frame accommodated in the housing, a lens barrel accommodating at least one lens, a viewfinder portion causing a frontward field of view to be visible through the viewfinder in the housing, and a drive lever rotatable about a first shaft. The lens barrel includes a stationary cylinder including a base fastened to the frame and a cylindrical wall extending in an axial direction from the base, an extendable unit located radially inward from the cylindrical wall of the stationary cylinder and extendable in the axial direction, and an operation cylinder rotatable relative to the stationary cylinder without moving in the axial direction to extend and contract the extendable unit. The operation cylinder includes a guide surface extending in a circumferential direction, and a lever drive adjacent to the guide surface in the circumferential direction. The lever drive has an outer diameter different from an outer diameter of the guide surface. The drive lever includes an actuation portion that comes in contact with the guide surface of the operation cylinder, and a drive gear including a plurality of teeth. The camera includes an urging member urging the actuation portion in the drive lever toward the guide surface of the operation cylinder, a prism that changes a direction of a field of view visible through the viewfinder portion, and a prism guide lever rotatable about a second shaft. The prism guide lever includes a prism holder holding the prism, and a follower gear including a plurality of teeth meshing with the plurality of teeth in the drive gear in the drive lever. The prism holder is placeable into the viewfinder portion.

In this structure, when the operation cylinder is rotated to extend the extendable unit with the actuation portion in the drive lever urged by the urging member toward the guide surface of the operation cylinder and in contact with the guide surface, the actuation portion in the drive lever moves to the lever drive adjacent to the guide surface. This causes the drive lever to rotate about the first shaft under an urging force applied from the urging member to the drive lever due to the difference between the outer diameter of the guide surface and the outer diameter of the lever drive. As the drive lever rotates, the prism guide lever with its follower gear meshing with the drive gear in the drive lever swings about the second shaft. As the prism guide lever swings, the prism held by the prism holder in the prism guide lever is placed into the viewfinder portion, allowing the prism to change the direction of the field of view visible through the viewfinder portion. In the structure described above, the field of view visible through the viewfinder portion can be easily changed depending on the extended state of the lens barrel.

The lever drive in the operation cylinder may be a recess adjacent to the guide surface.

The prism may include a first lens surface, a peripheral edge located outward from the first lens surface, at least one boss extending in a first direction from the peripheral edge, a second lens surface opposite to the first lens surface in the first direction, and at least one projection protruding in a second direction perpendicular to the first direction and in the first direction from the peripheral edge. The prism holder in the prism guide lever may include a side wall surrounding the prism, and a facing portion extending inward from the side wall and facing the peripheral edge of the prism. The facing portion in the prism holder may have at least one insertion hole to receive the at least one boss in the prism. The facing portion and the side wall of the prism holder may have an engagement hole engaged with the at least one projection in the prism.

In this structure, the prism is fastened to the prism holder in the prism guide lever by simply engaging the projection on the prism with the engagement hole in the prism holder in the prism guide lever and placing the boss in the prism into the insertion hole in the prism holder. The prism can thus be fastened to the prism guide lever without an adhesive. This structure thus avoids an adhesive adhering to the lens surfaces of the prism and causing an image observed through the prism to be less visible.

The at least one boss in the prism may include a pair of bosses located on both sides of the first lens surface in a third direction perpendicular to the first direction and to the second direction. The bosses located in this manner allow the prism to be fastened to the prism guide lever more firmly.

The peripheral edge of the prism may include an extension being a portion with a width enlarged in the third direction. The pair of bosses may be located on the extension in the peripheral edge.

The at least one projection in the prism may include a plurality of projections adjacent to each other. The multiple projections may be engaged with the corresponding engagement holes in the prism holder in the prism guide lever. This allows the prism to be fastened to the prism guide lever more firmly.

The peripheral edge and the first lens surface of the prism may have a step between the peripheral edge and the first lens surface. In this case, the bosses and the projections are located on surfaces different from the lens surface. The lens surface can thus be formed with high accuracy.

Although the embodiments of the present invention have been described above, the present invention is not limited to the above embodiments and may be modified variously within the scope of its technical idea.

What is claimed is:

1. A camera, comprising:
    a housing having a front surface with a viewfinder;
    a frame accommodated in the housing;
    a lens barrel accommodating at least one lens, the lens barrel including
        a stationary cylinder including a base fastened to the frame and a cylindrical wall extending in an axial direction from the base,
        an extendable unit located radially inward from the cylindrical wall of the stationary cylinder, the extendable unit being extendable in the axial direction, and
        an operation cylinder rotatable relative to the stationary cylinder without moving in the axial direction to extend and contract the extendable unit, the operation cylinder including a guide surface extending in a circumferential direction and a lever drive adjacent to the guide surface in the circumferential direction, the lever drive having an outer diameter different from an outer diameter of the guide surface;
    a viewfinder portion causing a frontward field of view to be visible through the viewfinder in the housing;
    a drive lever rotatable about a first shaft, the drive lever including
        an actuation portion configured to come in contact with the guide surface of the operation cylinder, and
        a drive gear including a plurality of teeth;
    an urging member urging the actuation portion in the drive lever toward the guide surface of the operation cylinder;
    a prism configured to change a direction of a field of view visible through the viewfinder portion; and
    a prism guide lever rotatable about a second shaft, the prism guide lever including
        a prism holder holding the prism, the prism holder being placeable into the viewfinder portion, and
        a follower gear including a plurality of teeth meshing with the plurality of teeth in the drive gear in the drive lever.

2. The camera according to claim 1, wherein
the lever drive in the operation cylinder is a recess adjacent to the guide surface.

3. The camera according to claim 1, wherein
the prism includes
    a first lens surface,
    a peripheral edge located outward from the first lens surface,
    at least one boss extending in a first direction from the peripheral edge,
    a second lens surface opposite to the first lens surface in the first direction, and
    at least one projection protruding in a second direction perpendicular to the first direction and in the first direction from the peripheral edge,
the prism holder in the prism guide lever includes
    a side wall surrounding the prism, and
    a facing portion extending inward from the side wall and facing the peripheral edge of the prism,
the facing portion in the prism holder has at least one insertion hole to receive the at least one boss in the prism, and
the facing portion and the side wall of the prism holder have an engagement hole engaged with the at least one projection in the prism.

4. The camera according to claim 3, wherein
the at least one boss in the prism includes a pair of bosses located on both sides of the first lens surface in a third direction perpendicular to the first direction and to the second direction.

5. The camera according to claim 4, wherein
the peripheral edge of the prism includes an extension being a portion with a width enlarged in the third direction, and
the pair of bosses are located on the extension in the peripheral edge.

6. The camera according to claim 3, wherein
the at least one projection in the prism includes a plurality of projections adjacent to each other.

7. The camera according to claim 3, wherein
the peripheral edge and the first lens surface of the prism have a step between the peripheral edge and the first lens surface.

* * * * *